United States Patent Office 3,404,019
Patented Oct. 1, 1968

3,404,019
COKE GROUND IN A NONOXIDIZING ATMOSPHERE
William W. Gotshall, Orchard Lake, Mich., assignor to Marathon Oil Company, Findlay, Ohio, a corporation of Ohio
No Drawing. Filed Mar. 4, 1965, Ser. No. 437,285
13 Claims. (Cl. 106—307)

The present invention relates to new forms of carbon and compositions containing these forms and in particular relates to specially processed forms of carbon derived from coke, and methods for their manufacture and use.

For many years, carbon has found widespread uses as a filler in plastic and particularly in rubber compositions. Because they permit the attainment of high tensile strengths, carbon blacks have been the preferred fillers and additives in such compositions. Carbon blacks include among others, acetylenic blacks, channel blacks, thermal blacks, and furnace blacks. Most of these are produced by the combustion of gases such as acetylene or natural gas, or of liquid petroleum products such as crude oils. Such processes involve incomplete combustion under carefully controlled conditions, followed by a collection step, as by scraping the carbon blacks from a surface on which they have been deposited. Because of the capital investment requirements, close control, relatively expensive raw materials, and especially low yields encountered in the production of carbon blacks, their price is relatively high and plants for their production are virtually always located near sources of raw materials.

The present invention permits the utilization of inexpensive by-products widely available in a number of geographic locations for the production of less expensive substitutes for carbon blacks. The carbon products of the present invention are all derived from cokes, preferably petroleum cokes, and most preferably fluid petroleum cokes. Unlike ground metallurgical cokes such as Austin blacks, which are sometimes used as fillers and extenders in low cost rubber products, the carbon products of the present invention provide moduli, sets, and tensile strengths in the finished formulations which are of the level of those obtained by use of good quality carbon blacks, and very superior staining properties.

The carbon products of the present invention are in general formed by processes which comprise the grinding, that is, comminuting of conventional cokes preferably in autogenous grinding mills, and especially in fluid energy mills of the type commonly referred to as "hurricane mills." According to the process of the present invention, the grinding is carried out under non-oxidizing conditions and air and free oxygen are excluded from the mills in which the grinding occurs. Thus, the present invention embodies the discovery that oxidizing agents have a deleterious effect on ground cokes which are intended for use in rubber or other polymeric materials.

While it is not intended that the present invention be restricted by any mechanism hypothesized herein, it appears that autogenous grinding of cokes produces particles having a high reactivity, possibly because of severing of bonds which may occur during the grinding process. Such severed bonds can react with the oxygen in the air and thereby lose their reactivity or, if properly protected as taught herein, they may be utilized to react with the other ingredients in polymeric materials and produce polymers and especially rubbers having excellent physical properties.

In addition to their economic advantages, the preferred forms of carbon of the present invention exceed by a substantial margin the American Society for Testing Materials' specifications for "non-staining blacks."

In a preferred embodiment of the present invention, fluid petroleum coke produced according to the methods of A. Vorhies, Fluid Coking, Proceedings of the Fourth World Petroleum Congress, Section III/F, page 360, and Petroleum Processing, March 1956, pages 135 to 137 is fed to a Model No. 30–10 mill manufactured by Majac, Inc., of Sharpsburg, Pa. Steam is preferably utilized as the grinding fluid and a sonic velocity approximately at 700 to 800° F. and 100 to 150 p.s.i.g. nozzle pressure is maintained throughout the grinding section of the mill. The classifier of the mill is operated to separate out about 5 micron or smaller particles and grinding is continued until the size distribution of the particles is as follows: 99% less than 5 microns; 50% less than 1.5 microns; 10% less than 0.5 micron. (All percentages in the present application are percents by weight unless otherwise specified.)

Care is taken to exclude oxygen, and the water from which the steam is prepared is preferably de-aerated prior to entering the steam boilers. The entire apparatus is lagged with 2 inches of insulation in order to minimize condensation on the walls of the mill.

While in the classifier, the product is sprayed with approximately 0.1 to 1.0% based on the weight of the product of zinc stearate. In order to prevent the deleterious effect caused by oxygen contact, the particles are individually coated with the zinc stearate until a relatively uniform coating is obtained.

When the coated product prepared as described above is utilized in rubber compositions containing approximately 65 parts of the new product per hundred parts of rubber, the coating material melts during the normal milling and vulcanization processes which are performed conventionally. The resulting rubber composition is found to have a tensile strength comparable to the average tensile strength obtained when utilizing good quality carbon blacks such as medium thermal blacks and has significantly superior modulus and set.

While the fluid petroleum cokes are preferred for the practice of the present invention, delayed cokes including among others those manufactured by the processes of U.S. 2,775,549, and even coal-derived cokes may be utilized with the present invention. In general, calcining to produce a coke of not more than about 7% volatiles is preferred prior to grinding.

In general, as small a particle size as possible will be preferred in the product from the fluid grinding step, but average particle sizes of not more than about 2.5 microns will be preferred and the preferred size distribution will be at least 90% less than 5 microns in size. The particle size will in all cases represent the average diameter of the individual particles after grinding. For reasons of economy, average diameters of about 1 micron or more will be preferred to reduce grinding costs.

The fluid energy mills may operate on a wide variety of inert, non-oxidizing media. By non-oxidizing media is meant media which do not react to any substantial degree under the conditions of grinding. In general, the oxidizing agents to be avoided are those commonly thought of as reactive, e.g., oxygen, ozone, ammonia, HCl, nitrogen oxides, etc. Steam is the most preferred grinding media from the standpoint of economy but nitrogen, helium, hydrogen, argon, and a wide variety of other gases commonly thought of as inert or reducing may be utilized. For maximum economy in grinding, gases of lower molecular weights, e.g., hydrogen and steam, will be preferred.

The grinding mills are preferably the "hurricane" type of autogenous mills including those manufactured by Majac, Inc. of Sharpsburg, Pa.; the reductionizer manufactured by Reduction Engineering Corporation; and the micronizer manufactured by the Sturtevant Mill Company of Boston. They are preferably operated in a conventional manner according to the manufacturer's recommendations.

The product from the mill can be immediately formulated into compositions to prevent its contact with an oxidizing atmosphere. However, in most cases, it will be preferable to coat the carbon product from the mill with a coating agent as described in the above preferred embodiment. The coating agent should, of course, readily allow dispersion of the carbon product during compounding. The coating agent must also be non-deleterious to the compositions in which the new form of coated carbon will be employed. A fugitive coating agent which evaporates or melts during processing, as for example, during the vulcanizing of rubber formulations, is particularly desirable. Melting or boiling points of from 70 to about 250° F. are preferred. In addition to the liquids, certain finely divided powders, e.g., zinc stearate, stearic acid, and solid primary amines will act as effective barriers against oxidizing atmospheres.

In general, rubber and other polymeric compounds formulated with the new forms of carbon of the present invention will have lower densities than comparable formulations with carbon blacks. Since most carbon products are formulated to fill a given volume, this lower density permits lighter fabricated materials and results in a substantial savings in ingredients which are in virtually all cases sold on a weight basis. In most cases, no revision of formulations will be required and approximately 0.87 pound of the new carbon forms of the present invention will replace one pound of carbon blacks conventionally used.

In addition to rubber compositions, the compounds of the present invention will also find use as fillers for common plastics such as nylons, methylmethacrylates, epoxies, polyurethanes, etc. An additional advantage in certain specialized applications is that the substitution of the equivalent amounts of the new forms of carbon for the carbon blacks previously used will in most cases increase both the electrical and thermal conductivity of the finished article.

Because of the combination of low set, high modulus, and unusually good non-staining properties of the carbon forms of the present invention, they are especially preferred for the production of tire carcasses. In such applications, their low sets provide low permanent distortion of the rubber, and correspondingly low heat buildups. This high modulus, by providing maximum strength under given stress, provides excellent shock absorbing qualities. Their non-staining properties are important in preventing the staining of whitewalls which are applied to tire carcasses.

EXAMPLE I

Preparation of fluid petroleum coke for use in the present invention

A conventional fluid petroleum coke apparatus is operated at a reactor temperature of 978° F., and an average temperature in the burner section of 1,135° F. The charge rate is 5,080 barrels per day of a 10 API gravity flux made from Wyoming crude having a Conradson carbon rating of approximately 23.6% carbon. The process used is a commercial fluid petroleum coking process as described in Petroleum Processing Magazine, March 1956, pages 135 to 137. The resulting coke has from 4 to about 5% volatiles, a bulk density of approximately 55 pounds per cubic foot and the individual coke particles have a specific gravity of approximately 1.52.

EXAMPLE II

Preparation of the new forms of carbon of the present invention

Coke produced according to Example I is fed to a Model No. 30–10 mill manufactured by Majac, Inc. of Sharpsburg, Pa., operating on steam at a nozzle pressure of approximately 100 to 500 p.s.i.g. and at 700 to 800° F. internal temperature. The output from the classifier has a particle size range of 90% less than 5 microns, 50% less than 1.5 microns, and 10% less than 0.5 micron. Approximately 0.1% by weight based on the weight of the carbon of zinc stearate is fed to the input of the classifier at a constant rate in order to individually coat the particles as they are moved by the classifier. The resulting coated form of pulverized coke is collected for use in the examples described below.

EXAMPLE III

The new form of carbon obtained from Example I is conventionally compounded with the following standard test formula:

| | Parts by wt. |
|---|---|
| Natural rubber | 100 |
| Stearic acid | 3.00 |
| Zinc oxide | 5.00 |
| Benzothiazyl disulfide | 0.60 |
| Sulfur | 2.50 |

This test formula is mixed with carbon blacks and with the new carbon forms of the present invention as indicated in Table A below, ASTM slabs were cured 10, 30, and 50 minutes at 293° F., and unaged physical tests were conducted conventionally at room temperature according to American Society for Testing Materials Standards D412, D676, and D624 with the results indicated in Table A.

EXAMPLE IV

Production of new forms of carbon utilizing coal-derived coke

When conventional coke produced conventionally in a rotating bed furnace and calcined to contain approximately 5% volatiles is pulverized in a fluid mill utilizing steam according to the processes of the present invention, the resulting material after being coated with approximately 0.1% zinc stearate gave us results similar to those obtained in Example III when compounded with rubber of similar composition.

TABLE A

| Carbon | Parts carbon per 100 parts test formula | Modulus (p.s.i. at 300% elongation) [1] | Ultimate tensile strength | Ultimate set, percent | Cure time (min.) | Stain test percent [2] |
|---|---|---|---|---|---|---|
| Industrial reference black | 50 | 2,600 | 3,460 | 22 | 50 | |
| Conventional medium thermal black | 75 | 1,370 | 2,710 | 25 | 50 | 91 |
| Steam pulverized carbon according to example II | 65 | 1,780 | 2,440 | 12 | 50 | 100 |
| 50% carbon of example II/50% medium thermal black | 70 | 1,480 | 2,560 | 17 | 50 | 98 |
| Carbon having particle size similar to example II except air ground | 65 | 1,240 | 2,190 | 14 | 50 | 100 |
| Steam pulverized carbon according to example II except not coated. Used immediately | 65 | 1,740 | 2,400 | 13 | 50 | 100 |
| Steam pulverized carbon according to example II except coated with stearic acid instead of zinc stearate | 65 | 1,740 | 2,350 | 13 | 50 | 100 |

[1] Only data at cure yielding highest modulus are shown.
[2] Procedure according to ASTM–D1618–5ST. (10 grams of the carbon to be tested are boiled with 100 ml. of benzene and filtered. Using a 425 millimicron filter, the light transmission is measured through the filtrate. Test results are expressed as percent transmitted with the light transmission through pure benzene being taken as 100%.)

EXAMPLE V

Production of new forms of carbon from delayed petroleum coke

When delayed petroleum coke, conventionally made in a delayed coking drum and calcined to about 5% volatiles is pulverized according to the processes of the present invention using steam in a fluid grinding mill, the resulting composition when coated with zinc stearate gives test results similar to those obtained in the Example III when compounded with rubber.

EXAMPLE VI

Other polymeric formulations

When the product of Example II is used as a filler in methyl methacrylate, epoxy, and polyethylene compositions, solid objects having excellent physical properties are obtained utilizing approximately 20% by weight of the carbon forms of the present invention.

It will be understood that the present invention is adaptable to a wide variety of modifications and variations in addition to those described above and the claims appended hereto are intended to cover all such apparent variations.

What is claimed is:

1. A non-staining finely divided carbon suitable for compounding with polymeric materials to form high strength, high modulus compositions, comprising comminuted coke having an average particle size of not over 2.5 microns, the coke having been ground to said particle size in a non-oxidizing atmosphere.

2. The form of carbon of claim 1 wherein the coke utilized is fluid petroleum coke and the carbon particles after grinding are at least 90% below 5 microns, with average particle size of from 1 to about 2.5 microns.

3. The finely divided carbon of claim 1 wherein the particles have a coating of a non-deleterious barrier to prevent contact with oxygen.

4. The finely divided carbon of claim 3 wherein the barrier has a melting point of from 70 to about 250° F.

5. The finely divided carbon of claim 3 wherein the barrier comprises zinc stearate.

6. The finely divided carbon of claim 3 wherein the barrier is a liquid having an atmospheric boiling point of from 70 to about 250° F.

7. The process of producing a non-staining finely divided carbon suitable for compounding with polymeric materials to form high strength, high modulus compositions comprising comminuting coke in a non-oxidizing atmosphere to an average particle size of not over 2.5 microns.

8. The process of claim 7 wherein the comminuted coke particles are thereafter coated with a non-deleterious barrier to prevent contact with oxygen.

9. The process of claim 8 wherein the barrier comprises zinc stearate.

10. The process of claim 7 wherein a major portion of the comminution is accomplished by fluid grinding.

11. The process of claim 10 wherein the coke utilized is fluid petroleum coke and the carbon particles after grinding are at least 90% below 5 microns with average particle size of from 1 to about 2.5 microns.

12. The process of claim 10 in which the non-oxidizing atmosphere comprises steam.

13. The process of claim 10 in which the non-oxidizing atmosphere comprises nitrogen.

References Cited

UNITED STATES PATENTS

| | | | |
|---|---|---|---|
| Re. 21,302 | 12/1939 | Grote | 23—209.1 |
| 1,946,053 | 2/1934 | Baldwin | 106—308 |
| 2,635,057 | 4/1953 | Jordan | 106—309 |
| 2,721,168 | 10/1955 | Kimberlin et al. | 201—42 |
| 2,735,624 | 2/1956 | Beck | 241—39 |
| 2,908,634 | 10/1959 | Stratford | 241—39 |
| 3,020,210 | 2/1962 | Stephens, et al. | 23—209.4 |
| 3,264,240 | 8/1966 | Segura et al. | |
| 3,284,334 | 11/1966 | Metrailer | 23—209.4 |
| 3,301,694 | 1/1967 | Kraus et al. | 106—307 |
| 3,329,646 | 7/1967 | Gessler | 106—307 |

TOBIAS E. LEVOW, *Primary Examiner.*

S. E. MOTT, *Assistant Examiner.*

UNITED STATES PATENT OFFICE
CERTIFICATE OF CORRECTION

Patent No. __3,404,019__          Dated __October 1, 1968__

Inventor(s) __William W. Gotshall__

It is certified that error appears in the above-identified patent and that said Letters Patent are hereby corrected as shown below:

Col. 1, lines 39-40:   For "blacks" substitute --Black pulverized coal (a trademark of the Slab Fork Coal Company)

SIGNED AND
SEALED
APR 14 1970

(SEAL)
Attest:

Edward M. Fletcher, Jr.
Attesting Officer

WILLIAM E. SCHUYLER, JR.
Commissioner of Patents